United States Patent
Li et al.

Patent Number: 5,438,485
Date of Patent: Aug. 1, 1995

[54] ILLUMINATOR FOR USE WITH A REMOTE LIGHT SOURCE

[75] Inventors: John X. Li, Farmington Hills; Jeffrey A. Erion, Plymouth; Amir Fallahi, Holly, all of Mich.

[73] Assignee: Ford Motor Company, Dearborn, Mich.

[21] Appl. No.: 1,709

[22] Filed: Jan. 7, 1993

[51] Int. Cl.6 .............................. F21V 8/00; B60Q 1/04
[52] U.S. Cl. ..................................... 362/32; 362/61; 362/298; 385/31; 385/901
[58] Field of Search ............... 362/32, 297, 298, 346, 362/61, 26, 302, 304; 385/901, 902, 31, 36

[56] References Cited

U.S. PATENT DOCUMENTS

| | | | |
|---|---|---|---|
| 1,419,482 | 6/1922 | Wood . | |
| 2,589,569 | 3/1952 | Peter et al. | 362/32 |
| 3,536,908 | 10/1970 | Oster | 362/32 |
| 3,749,906 | 7/1973 | Thiry | 362/346 |
| 3,772,506 | 11/1973 | Junginger | 362/32 |
| 4,037,096 | 7/1977 | Brendgord et al. | 362/298 |
| 4,054,364 | 10/1977 | Webster | 385/31 |
| 4,084,215 | 4/1979 | Willenbrock | 362/32 |
| 4,241,382 | 12/1980 | Daniel . | |
| 4,463,410 | 7/1984 | Mori | 362/346 |

FOREIGN PATENT DOCUMENTS

| | | | |
|---|---|---|---|
| 830477 | 5/1938 | France | 362/298 |
| 83245 | 5/1964 | France | 362/297 |
| 2710553 | 9/1978 | Germany . | |

*Primary Examiner*—Ira S. Lazarus
*Assistant Examiner*—Y. Quach
*Attorney, Agent, or Firm*—Roger L. May; Kevin G. Mierzwa

[57] ABSTRACT

An illuminator for vehicle exterior lamps using a remote light source. Light is transmitted to the illuminator by a light guide, such as a fiber optic light pipe. The illuminator utilizes a complex mirror and a reflector to collect and collimate over 80% of the light from remote light source into a desired parallel beam for use as an automotive headlight.

6 Claims, 4 Drawing Sheets

# ILLUMINATOR FOR USE WITH A REMOTE LIGHT SOURCE

BACKGROUND OF THE INVENTION

1. Field of the Invention

The present invention relates generally to a lighting system for a vehicle and more specifically to an illuminator for use, in combination with a remote light source, as a headlight or taillight on a vehicle.

2. Description of the Related Art

Conventional vehicle lighting systems typically use a bulb and reflector combination. In a bulb and reflector combination, the filament of the bulb is placed at or near a focal point of a parabolic reflector. The focal point of a reflector is that point at which parallel rays of light meet after being reflected by the reflector. Conversely, light rays emanating from the focal point are reflected as parallel rays of light. The light emitted by the bulb filament is collected by the reflector and reflected outward to form a light beam. A lens is used to shape the light beam into a specified pattern to satisfy vehicle lighting standards and regulations. Typically in an automotive application, a conventional bulb and reflector combination only collects and reflects about thirty percent of the light emitted from the bulb filament.

When used in an automotive application, bulb and reflector combinations have several disadvantages which restrict aerodynamic and aesthetic styling; e.g., the depth of the reflector along its focal axis and the height of the reflector perpendicular to the focal axis have greatly limited attempts at streamlining the front end of a vehicle. Additionally, the thermal energy given off by the bulb filament during operation must be considered. This in turn dictates the size of the reflector and the material which can be used in its construction. Decreasing the size of the reflector requires use of high heat plastics for the lens and body of the reflector.

Another disadvantage of a bulb and reflector combination is that the light not radiated toward the reflector is radiated outward through the lens into a region outside the specified or established beam pattern resulting in glare and an undesirable beam pattern.

One approach to utilize and control the light radiating directly outward from the filament is disclosed in U.S. Pat. No. 4,654,758 which shows a headlight having a paraboloidal shaped reflector with a light emitting element placed at or near the focal point of the reflector. A transparent cover plate or lens seals the reflector. A convex mirror is positioned between the lens and light emitting element to reflect the directly outward radiating light to the paraboloidal reflector to further coverage the light beam and prevent spreading over a wide spatial angle.

While this approach may be useful, a certain portion of the light emitted by the filament escapes reflection. Additionally each light ray must be reflected several times before it exits the reflector. Since each reflective surface is not ideal the rays diffract and lose energy. Finally the disclosed device fails to consider the thermal energy given off by the filament.

Therefore, it is desireable to have a high efficient, low profile illuminator having reduced space requirements as dictated by both thermal concerns and vehicle aerodynamic and styling requirements.

SUMMARY OF THE INVENTION

Accordingly, the present invention is a highly efficient, unique low profile illuminator for use on a vehicle. In general, the illuminator includes a remote light source having a light pipe or guide connected thereto. The light guide transmits light from the light source to a first reflective surface which spreads or disperses the light in a set pattern. A second reflective surface then collects and collimates the spread light and directs the light into a desired region or area of use.

One advantage of the present invention is that low profile and high efficient headlights can be developed allowing a designer greater latitude with respect to vehicle aerodynamic and styling considerations. Another advantage is the elimination of any space adjacent the illuminator. The space is necessary for a filament bulb and reflector combination to provide clearance for an individual to remove and change the bulb.

Further advantages of the present invention include reduced or eliminated thermal considerations due to the elimination of the bulb filament which allows the lens to be brought closer to the light source to further reduce the overall size of the illuminator. An additional advantage is that substantially all of light from the light guide is collected by the reflector such that the light collection efficiency of a headlight using an illuminator according to the present invention can reach as high as 80%.

A further advantage is the glare free design of the illuminator. Since all of the light reflects from the first reflective surface, the radiation pattern of the light is controlled and directed into the desired pattern.

DESCRIPTION OF THE PREFERRED EMBODIMENT(S)

Figure 1:
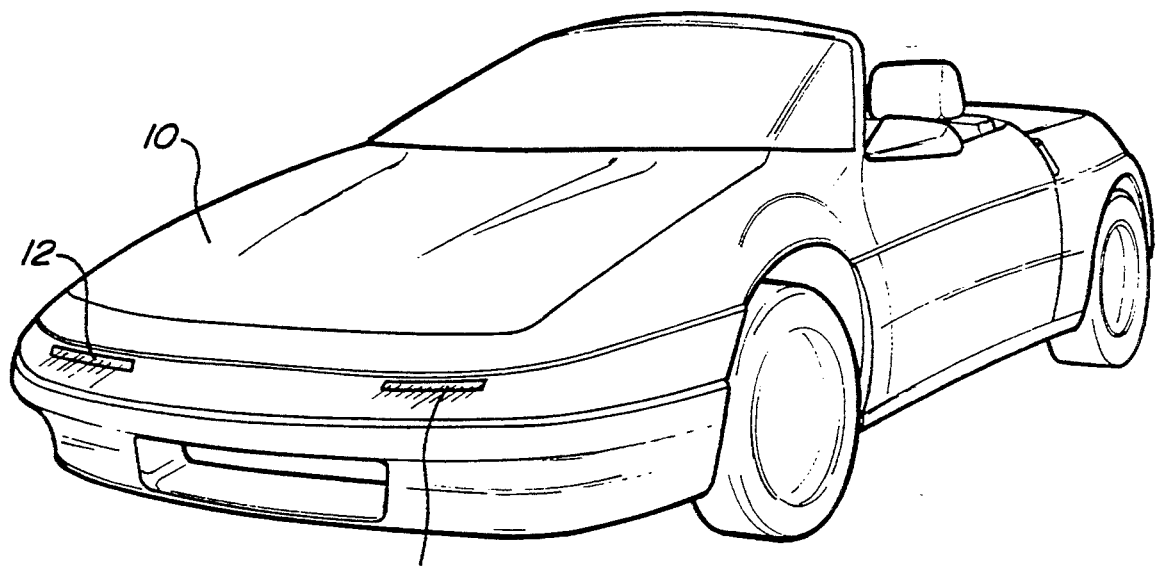
FIG. 1 is a perspective view of an illuminator according to the present invention, illustrated as a headlight on a vehicle.

Referring to the drawings and more particularly to FIG. 1 thereof, a vehicle 10 utilizing an illuminator 12, according to the present invention, as a vehicle headlight is shown. As set forth more fully herein, the illuminator 12 is a "cold bulb" or light system which is not a heat source. While the invention set forth herein may be utilized for other lighting uses, the following description sets forth the use with respect to a vehicle headlight.

Figure 2:
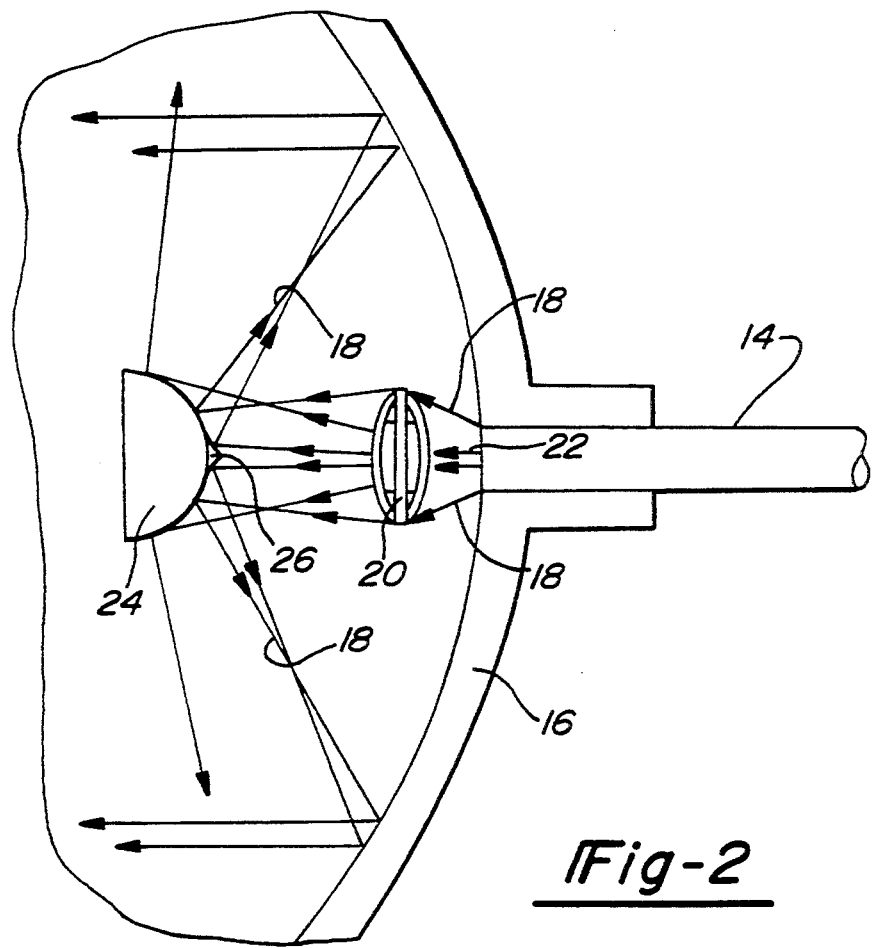
FIG. 2 is a schematic view of the illuminator of FIG. 1.

As illustrated in FIG. 2, the illuminator 12 receives light through a light guide 14, such as a fiber optic light pipe, which transmits light from a remote light source (not shown). The light guide 14 extends into a reflector 16. Light rays 18 exit the light guide 14 at a specific cone angle. The cone angle varies depending upon the type of light guide 14 used, typical cone angles vary from 25° to 70°. The light rays 18 are captured by a convergent lens 20 which focuses the light rays 18 onto a first reflective surface, such as a spherical mirror 24. The spherical mirror 24 spreads the light rays 18 outward onto a second reflective surface, such as a paraboloidal reflective surface of the reflector 16. It is well known to use a paraboloidal reflector surface to focus or collimate light rays emitted from a light source. A paraboloidal shaped surface is created by revolving a parabola about its focal axis. The focal axis is the axis containing the focal point and perpendicular to the directrix of the parabola. The spherical mirror 24 is aligned with the focal point of the reflector 16 enabling the reflector 16 to collect and collimate the light rays 18 reflected by the spherical mirror 24. Use of a convergent lens 20 to focus the light rays 18 on the spherical mirror 24 enables use of a light guide 14 having increased cone angles. It should be appreciated that as the cone angle of the light guide 14 increases the amount of light that can be transmitted by the light guide 14 also increases.

Figure 5:
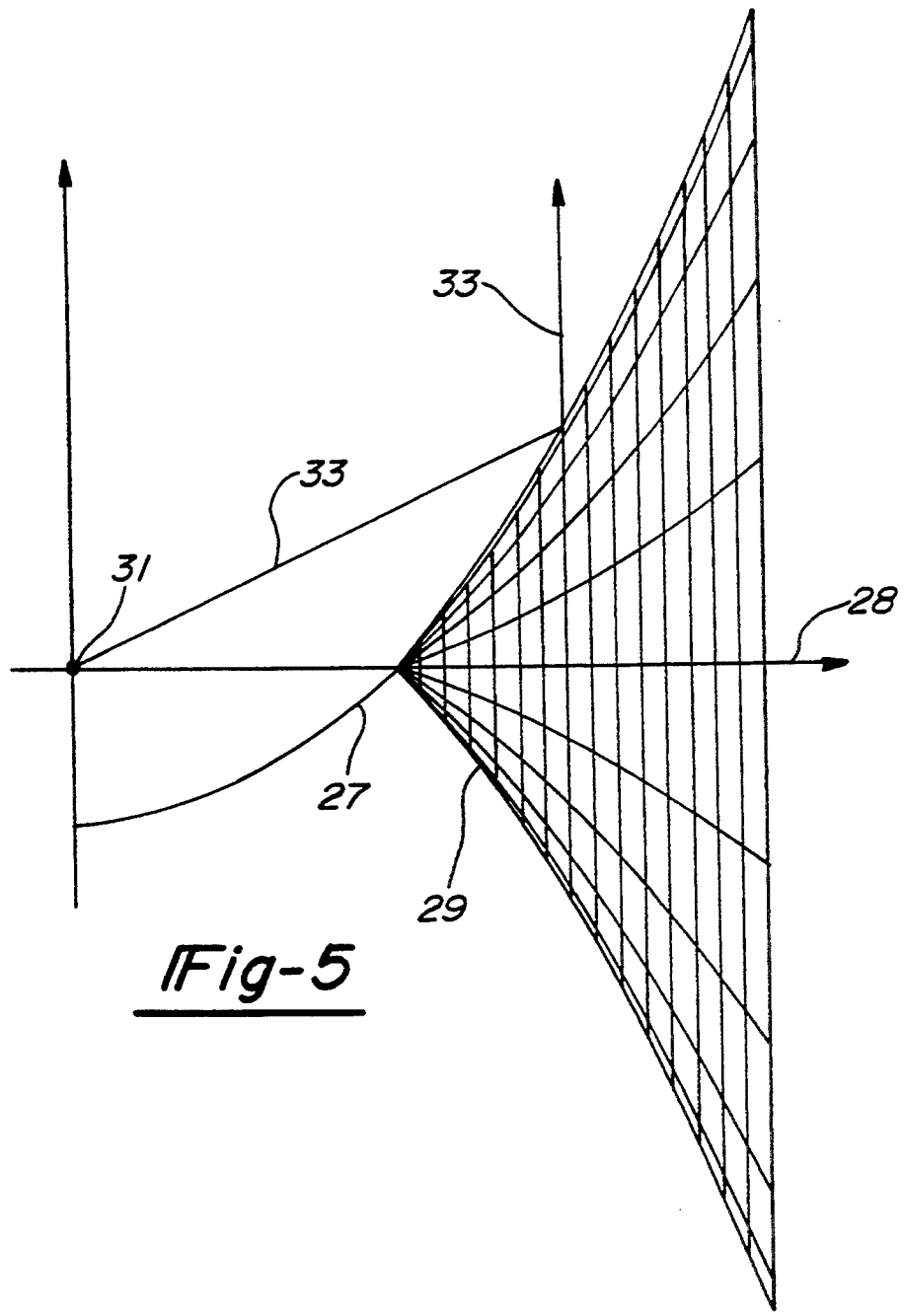
FIG. 5 is a schematic view of a cone mirror profile of the illuminator of FIG. 1.

In order to prevent light rays 22 with low exit angles from being reflected back into the light guide 14 by the spherical mirror 24, a small cone shaped mirror 26 is positioned immediately in front of the spherical mirror 24 and reflects the low exit angle light rays 22 outward towards the reflector 16. Depending upon design requirements, the cone shaped mirror 26 may have different surface profiles. As illustrated in FIG. 5, a cone shaped mirror surface 29 can be generated by rotating a section of a parabola 27 having a focal point 35 about a horizontal axis 28, typically the focal axis of the reflector 16. It should be appreciated that cone shaped mirror surface 29 of the cone shaped mirror 26 has only one common focal point 35 which limits any spreading of the light rays 33 in the final parallel light beam.

Figure 3:
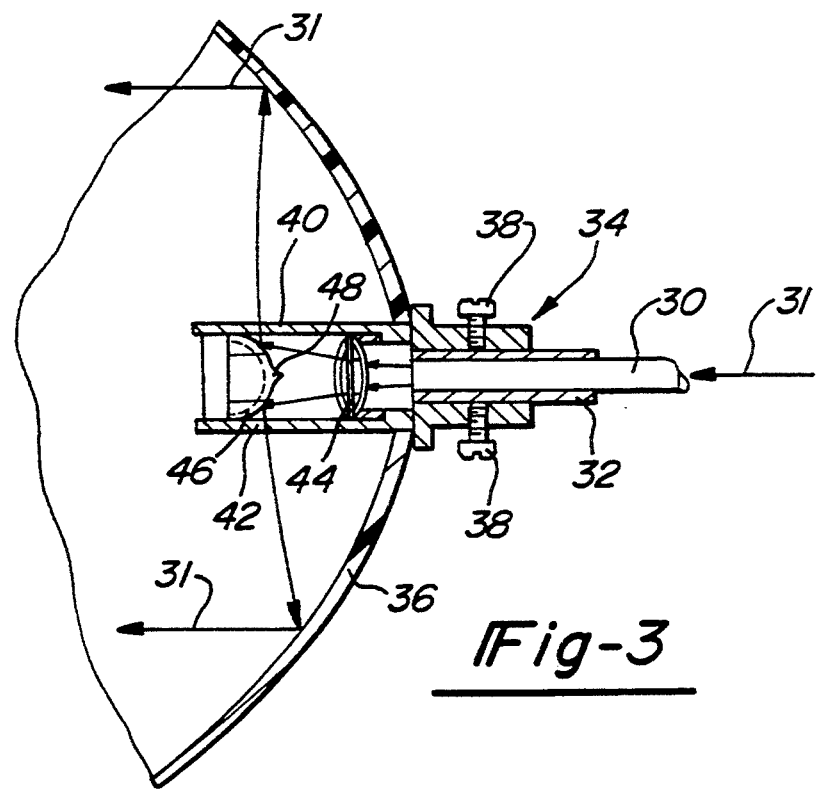
FIG. 3 is a fragmentary view of the illuminator of FIG. 1.

Referring now to FIG. 3, one embodiment of the illuminator 12 according to the present invention is shown. The illuminator 12 includes a light guide 30, transmitting light rays 31, having a fitting 32 attached to one end of the light guide 30. The fitting 32 is secured to a support 34 on a paraboloidal reflector 36 through mounting screws 38. The support 34 further includes outwardly projecting longitudinal arm members 40, 42. Secured between the longitudinal arm members 40, 42 is a convergent lens 44 and a spherical mirror 46 which includes a cone shaped mirror 48 to reflect the low angle light rays emitted from the light guide 30. The convergent lens 44 and spherical mirror 46 are positioned on the longitudinal arm members 40, 42 in a spaced relationship such that light rays 31 exiting from the light guide 30 are focused by the convergent lens 44 onto the spherical mirror 46. The spherical mirror 46 spreads the light over the surface of a paraboloidal reflector 36 which collects and collimates the light rays 31 into a useable light beam.

Figure 6:
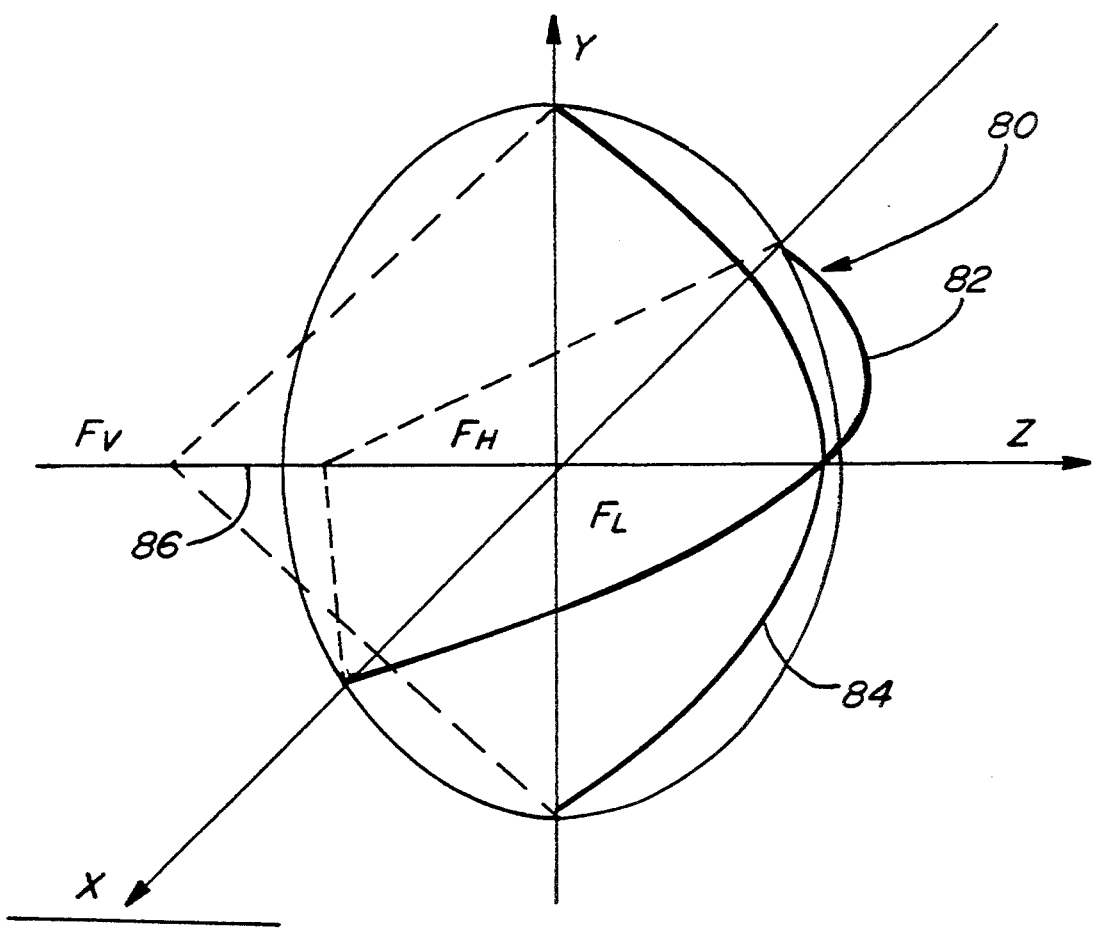
FIG. 6 is a diagrammatic view of the spherical portion of the first reflective surface.

Referring back to FIG. 2, although the illuminator 12 shown and disclosed in this application as a compound, spherical mirror, and a circular headlight, the illuminator 12 may also be used with other headlight shapes. When used with a rectangular shaped headlight, the spherical portion of the first reflective surface or mirror may be made bifocal; i.e., having one focal length in the vertical direction represented by the y-axis in FIG. 6 and a second focal length in the horizontal direction represented by the x-axis in FIG. 6. The focal length is the distance between the vertex and the focal point or focus of the curve or shape. By changing the focal length the direction of the light rays striking the first reflective surface can be controlled. As shown in FIG. 6, the reflector surface 80 has multiple focal points. $F_H$ is the focal point for the surface 82 defined by a cut along the x-axis. $F_V$ is the focal point for the surface 84 defined by a cut along the y-axis. It should be appreciated that the origin or intersection of the x and y axes is positioned coincidental with the focal point of the second reflector surface. As shown in FIG. 6, the focal line 86 is the line extending between the respective focal points $F_H$, $F_V$ and is positioned coincidental with the focal axis of the second reflective surface. Thus, in any direction, the light rays 18 reflected from the first reflective surface 24 have a spread pattern which matches the geometry of the second reflective surface 16 such that only the second reflective surface 16 is illuminated by the light rays 18 reflected from the first reflective surface 24. The present invention allows the designer the freedom to design low, height and wide angle headlights for use on a vehicle.

Figure 4:
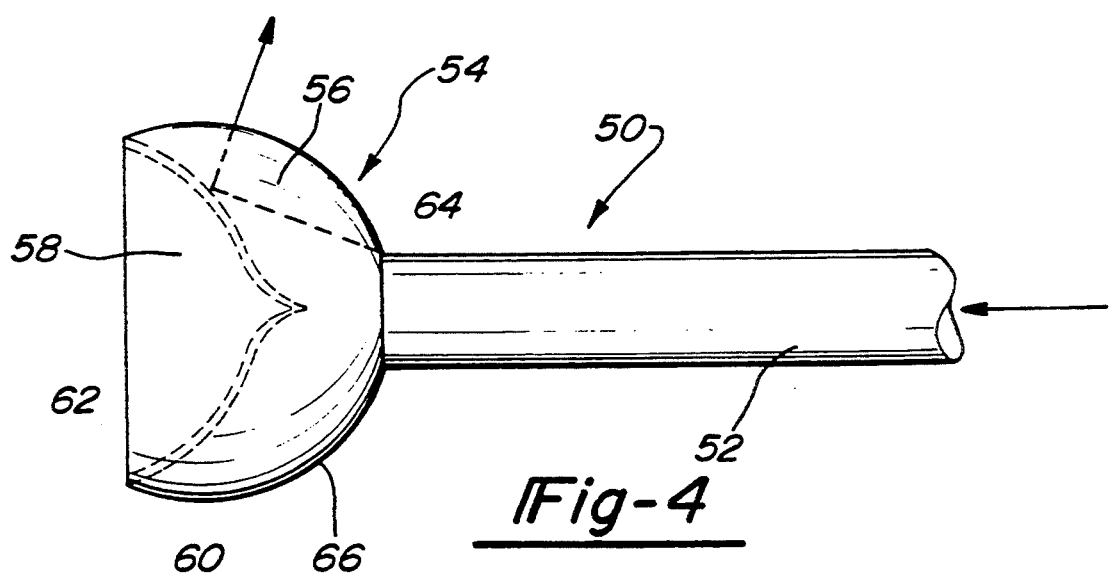
FIG. 4 is a side view of an alternative embodiment of the illuminator of FIG. 1.

Referring to FIG. 4, an alternative embodiment of an illuminator 50 according to the present invention is shown. A light guide 52 is coupled to a solid body 56 typically formed of a transparent optical material such as polycarbonate or acrylic. The solid body 56 has a shaped cavity 58 therein. The cavity is shaped in the form of the spherical mirror 24 and the cone shaped mirror 26 of the illuminator 12. The interior surface 60 Of the shaped cavity 58 including a reflective coating 62 applied thereto. A light ray 64 exiting the light pipe 52 is reflected by the reflected coating 62 and exits through the outer surface 66 of the solid body 56 wherein the ray 64 is collected and collimated by a reflector (not shown). It should be appreciated that the outer surface 66 of the bulb 54 may be formed of any shape necessary to prevent any internal reflection of the light ray 64 from occurring at the outer surface/air interface thus allowing the reflected light rays 64 to pass directly to the reflector. It should be appreciated that this embodiment provides an optical system free of individual air spaced optical components which are interdependent upon precise optical alignment. Since the illuminator 50 is of integral construction, it may be properly aligned with the focal point of the reflector and can even be manufactured continuous with the reflector thereby reducing or eliminating any alignment problems and simplifying manufacture and cost.

It will be seen that the illuminator or "cold bulb" provides a greater light collection efficiency while allowing the designer the freedom to utilize a lower headlight design. Since up to 80% of the light from the light guide may be converted into a desired parallel beam, the lighting efficiency of the illuminator 12 over the traditional filament bulb and reflector combination is greatly increased. It should be appreciated that the present invention eliminates the heat associated with filament bulbs and the use of costly mechanical fittings while providing a long term lighting device having a stable and precise optical alignment, that is, not sensitive to technical reliability and production problems typically associated with conventional lighting systems.

The illuminator of the present invention allows the height of vehicle headlights to be reduced to meet the need for aerodynamic design and styling as required by current consumer preferences and mileage standards. Additionally, the radiation pattern of the illuminator can be designed to fit the appropriate headlight design standards.

What is claimed is:

1. An illuminator for use with a light source, optically coupled to an end of a light pipe comprising:
   a solid body optically coupled to another end of said light pipe including a first reflective surface on an end of said solid body such that light from said light source entering said solid body is reflected out of said body by said first reflective surface;
   a second reflective surface spaced from said first reflective surface for collecting and reflecting substantially all of the light reflected by said first reflective surface;
   said second reflective surface includes a paraboloidal shaped reflector having a focal point and said first reflective surface having a center point aligned with said focal point; and
   said first reflective surface includes a spherical portion and a cone shaped portion.

2. An illuminator as set forth in claim 1 including a lens, positioned proximate to said first reflective surface, to focus the light exiting the light source onto said first reflective surface.

3. An illuminator as set forth in claim 1 wherein said solid body is made from at least one material selected from a group of polycarbonate and acrylic.

4. An illuminator as set forth in claim 1 wherein said first reflective surface reflects said light in a predetermined geometric pattern and said second reflective surface configured such that light reflected by said first reflective surface illuminates only said second reflective surface.

5. An illuminator for use with a light source comprising:
   a first reflective surface positioned to reflect substantially all the light emitted from the light source, said reflective surface including a compound mirror having a spherical portion having a center point and a cone shaped portion; and
   a second reflective surface having a parabolic shape, spaced apart from said first reflective surface for collecting substantially all of the light reflected by said first reflective surface, said second reflective surface including a focal point and a focal axis, said center point of said spherical portion coincident with said focal point of said second reflective surface, said cone shaped portion of said first reflective surface includes a surface generated by revolving a section of a parabola about said focal axis.

6. An illuminator as set forth in claim 5 wherein said spherical portion of said first reflective surface includes a bifocal surface having one focal length in the vertical direction and one focal length in the horizontal direction.

* * * * *